Dec. 4, 1962 F. C. MOCK 3,066,488
POWER OUTPUT CONTROL FOR A GAS TURBINE ENGINE
Filed Nov. 4, 1959 13 Sheets-Sheet 1

INVENTOR.
FRANK C. MOCK,
BY
James L. O'Brien
ATTORNEY.

INVENTOR.
FRANK C. MOCK.
BY
ATTORNEY.

Fig. 7

Dec. 4, 1962 F. C. MOCK 3,066,488
POWER OUTPUT CONTROL FOR A GAS TURBINE ENGINE
Filed Nov. 4, 1959 13 Sheets-Sheet 7

INVENTOR.
FRANK C. MOCK.
BY James L. O'Brien
ATTORNEY.

INVENTOR.
FRANK C. MOCK.
BY
ATTORNEY.

Dec. 4, 1962 F. C. MOCK 3,066,488
POWER OUTPUT CONTROL FOR A GAS TURBINE ENGINE
Filed Nov. 4, 1959 13 Sheets-Sheet 10

Fig. 15

INVENTOR.
FRANK C. MOCK.
BY
James L. O'Brien
ATTORNEY.

Dec. 4, 1962 F. C. MOCK 3,066,488
POWER OUTPUT CONTROL FOR A GAS TURBINE ENGINE
Filed Nov. 4, 1959 13 Sheets-Sheet 13

INVENTOR.
FRANK C. MOCK.
BY
James L. O'Brien
ATTORNEY.

United States Patent Office 3,066,488
Patented Dec. 4, 1962

3,066,488
POWER OUTPUT CONTROL FOR A GAS
TURBINE ENGINE
Frank C. Mock, South Bend, Ind., assignor to The Bendix
Corporation, a corporation of Delaware
Filed Nov. 4, 1959, Ser. No. 850,819
6 Claims. (Cl. 60—39.24)

The present invention relates to compressor and gas turbine engine controls and has for an object to provide an improved dynamic fluid compressor or pump which will maintain its efficiency through a wide range of delivery rates. Another object is the improvement of the light load fuel consumption of a gas turbine engine having an axial or multi-stage compressor, without the use of a heat exchanger or multiplication of compressor or turbine units. Another object of the invention is to overcome the tendency of multi-stage compressor to stall or operate unstably at intermediate speeds and maximum torque.

The principal object of the invention as it applies to the gas turbine engines is accomplished by the use of a special form of throttling stator blade in the compressor, in conjunction with a variable turbine gate, whereby the power output is reduced while the speed of the engine is maintained. Thus maintaining full load values of the compression and expansion ratios and the thermal efficiency. To accomplish this result the turbine capacity must also be controlled so that the turbine and compressor will be matched as to power throughout the operating range of the engine; i.e. the compressor drive power output of the turbine system, as determined by the gas volume, fuel feed and pressure drop across it, must equal the power absorbed by the compressor. Also the airflow through the compressor, as determined by its effective flow area, speed and the pressure rise across it, must equal the gas flow through the turbine which is determined by its effective flow area, the gas temperature and (above Mach 1.0) by the pressure at the entrance to the turbine (or at the higher flows, by the absolute pressure at the turbine entrance).

In a multi-stage compressor wherein the individual stage area does not vary with speed, there is a tendency in the compressor to stall at low and intermediate speeds if the compressor passages are proportioned for high speed operation. Since the mass flow through the compressor stages must vary as a function of the area times velocity times density, and since the density increase due to compression at lower speeds is less than at higher speed, it follows that at low speeds the upstream flow channel areas are too small or conversely, the downstream flow channel areas are too large. The present invention overcomes the tendency of the compressor to stall or operate unstably at speed less than maximum by decreasing the ratio of the flow channel areas of the upstream stages relative to the downstream stages with change of engine speed.

These and other objects and advantages of the present invention will become readily apparent from the following detailed description taken in connection with the appended drawings wherein:

FIGURE 16 is a view taken along line 16—16 of FIGURE 4;

Figure 1:
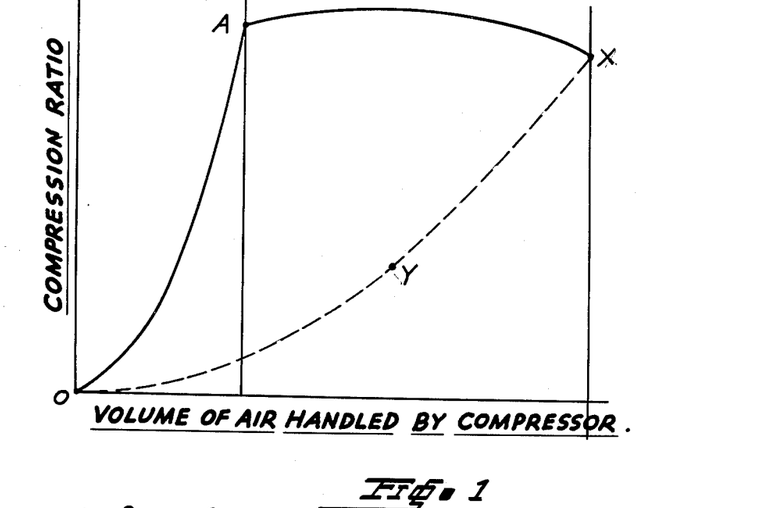
FIGURES 1, 2 and 3 are graphs showing certain operating characteristics of a gas turbine engine embodying the present invention.

Referring now to the drawings and more particularly to FIGURE 1, the dotted line OYX represents the operating characteristics of an ordinary gas turbine engine where the compression ratio varies approximately as the square of the airflow which in turn varies as a function of engine speed. When the ordinary gas turbine engine is operated at power outputs below 0.7 of the maximum, the specific fuel consumption is in the order of twice the maximum power specific fuel consumption. The present invention provides for control of the compression ratio somewhat independently of the volume of air consumed, whereby the engine may have an operating characteristic illustrated by the line OAX in FIGURE 1 rather than OYX of an ordinary engine. An operating characteristic defined by line OAX provides greater thermal efficiency throughout the operating range of the engine and also provides for higher operating speeds at all points below maximum power with a resulting increase in engine response or vehicle acceleration.

The operating characteristic between points A and X of FIGURE 1 accounts for approximately the upper two-thirds of the power range of the engine. Power variation between points A and X is obtained by keeping the engine at approximately constant speed, coordinating fuel feed to airflow so that the turbine inlet gas temperature is at a safe maximum and by simultaneously varying the effective capacity of the compressor and the turbine as will be explained later. The curve between A and X of FIGURE 1 represents high efficiency operation. It is, however, possible to utilize the control of the present invention to operate the engine in the region between the curves OAX and OYX by varying engine speed, engine temperature and the effective capacities of the compressor and turbine as desired.

Figure 2:
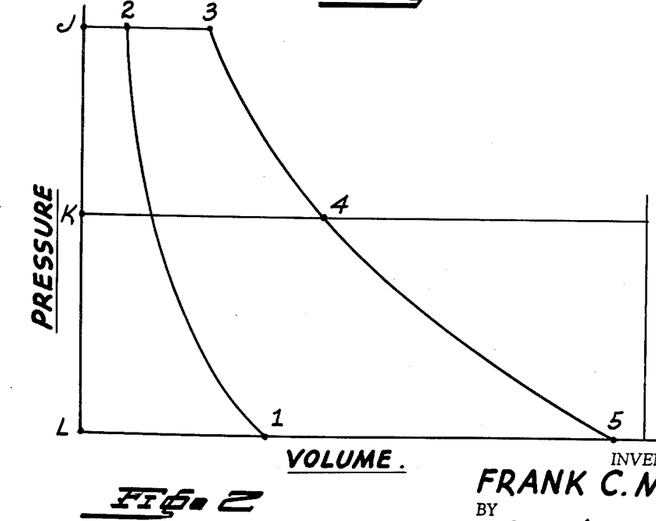
Figures 3, 12:
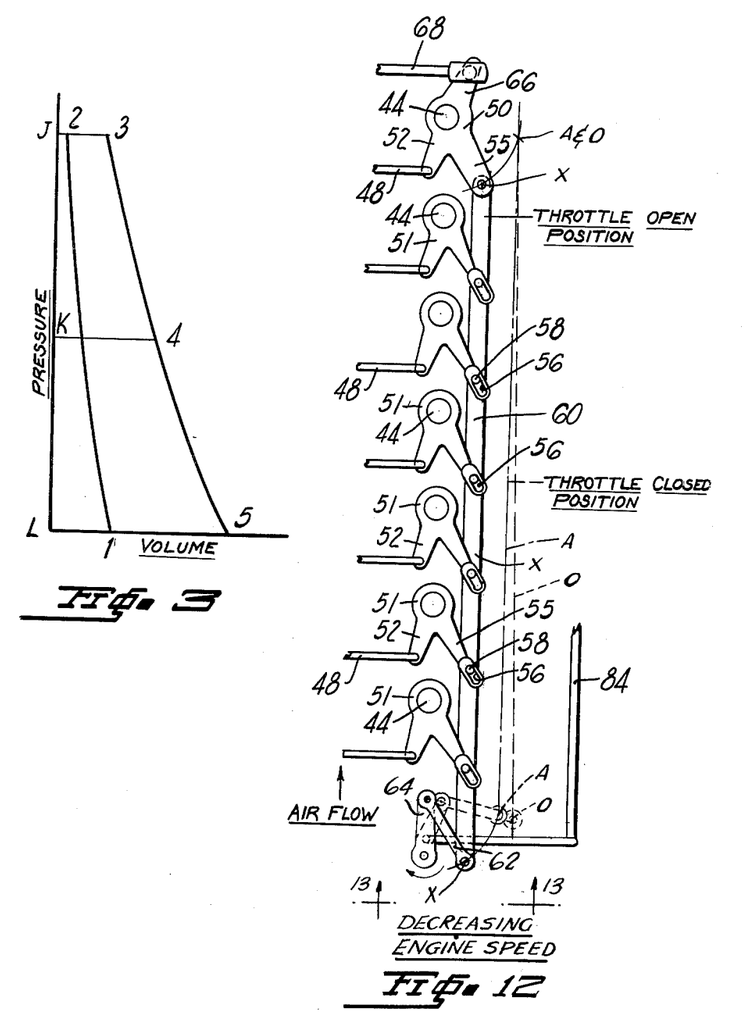
FIGURE 12 is a view of the stator throttle actuating mechanism of FIGURE 7 showing its various operating positions.

FIGURES 2 and 3 show the effect of varying the capacities of the compressor and the turbine which drives it. FIGURE 2 represents the operating characteristics of the engine with the compressor and turbine operating at maximum capacity and full speed, and FIGURE 3 represents minimum capacity full speed operation. As shown in both FIGURE 2 and FIGURE 3 air enters the engine at station 1 at atmospheric or ram pressure and temperature. It is compressed to station 2 to a pressure of perhaps 4 atmospheres and to a temperature of about 200° F. and the work of compression and delivery may be represented by the area 1—2—J—L. Sufficient fuel is then burned in the combustion chamber to raise the temperature of the gas entering the turbine at this pressure at station 3 to about 1500° F. with a corresponding increase in volume to point 3. From station 3 to 4 the gas expands through the turbine and decreases in temperature to about 1200° F., the work from the turbine being represented by the area 3—4—K—J. In the embodiment shown in FIGURE 4 wherein a second turbine drives a propeller shaft, the expansion through the second turbine occurs from station 4 to station 5 wherein the temperature is further reduced to about 750° F., the pressure is reduced to substantially atmospheric with this work represented by the area 4—5—L—K. In the case of the embodiment shown in FIGURE 20 wherein the power output of the engine is represented by thrust, the expansion from station 4 to station 5 represents the expansion through the exhaust nozzle.

Note that for any given power output, the determination of the turbine expansion level at the point 4 is a rather complex affair, since it depends upon the initial intake volume 1—L: upon the compression rise L—J: upon the heat addition 2—3: and upon the area of the exhaust outlet: the final purpose being that, as already stated, the area 3—4—K—J must balance the area 1—2—J—L. Obtaining such balance is a vital part of this invention.

Figure 4:
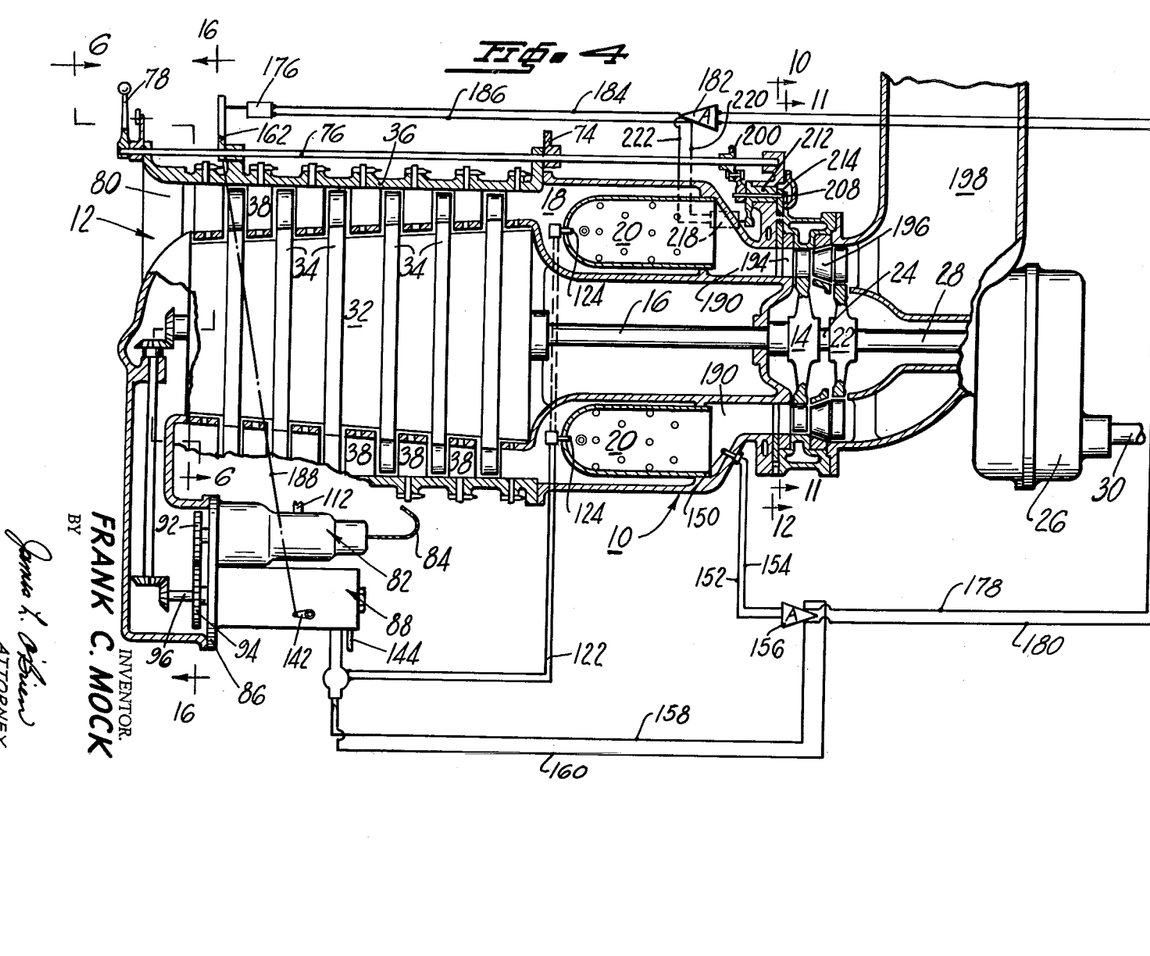
FIGURE 4 is a sectional view of a gas turbine engine embodying the present invention.

Referring now to FIGURE 4, numeral 10 designates a gas turbine engine having a multi-stage axial flow compressor 12 driven by a turbine 14 through a shaft 16. The outlet of compressor 12 is connected by means of a flow path 18 and 190 to the inlet of turbine 14. Combustion chambers 20 are mounted in flow path 18 to receive air from the compressor and to discharge the products of combustion to the turbine 14. A second turbine 22 is connected to turbine 14 by a shaft 24 and to a gear reduction box 26 by means of shaft 28, however the connection 24 may be omitted if desired. Box 26 may contain reverse gearing, clutches or pitch controls necessary to provide the desired power output to the output shaft 30.

Figure 5:
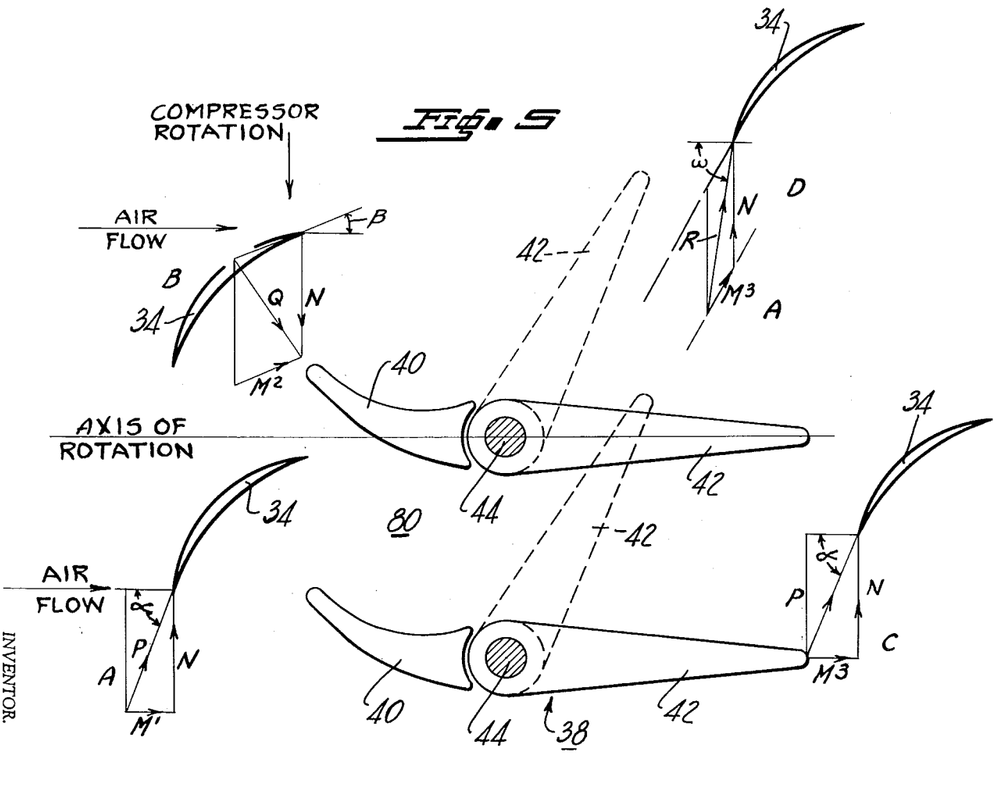
FIGURE 5 is an enlarged fragmentary view of the compressor stator and rotor blades shown in FIGURE 4.
Figure 6:
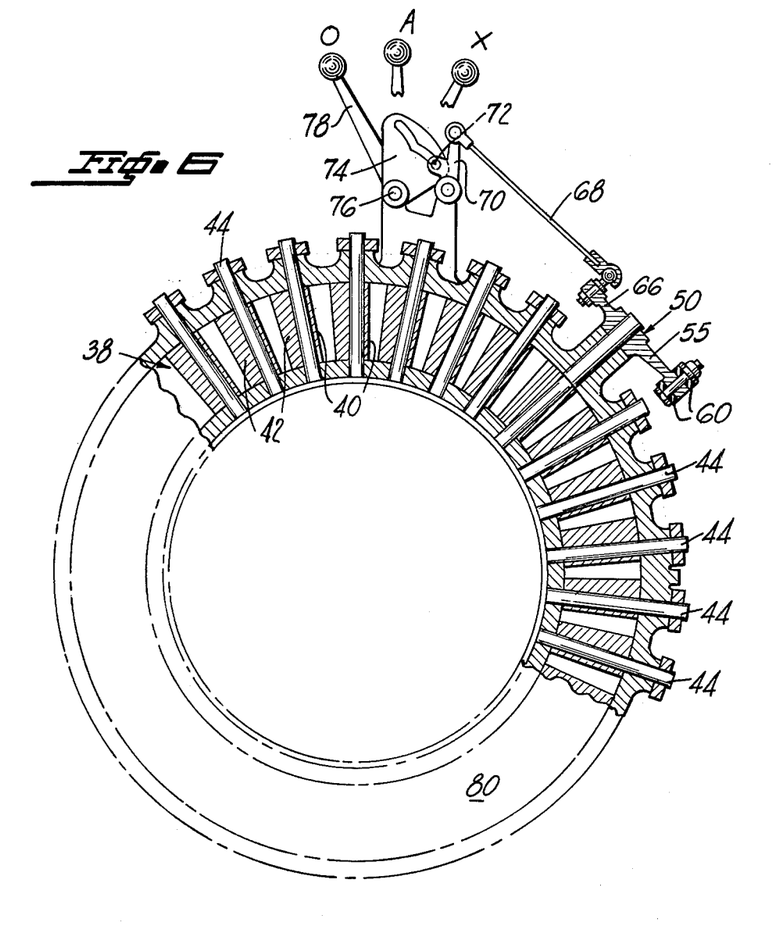
FIGURE 6 is a sectional view taken along line 6—6 of FIGURE 4.
Figure 7:
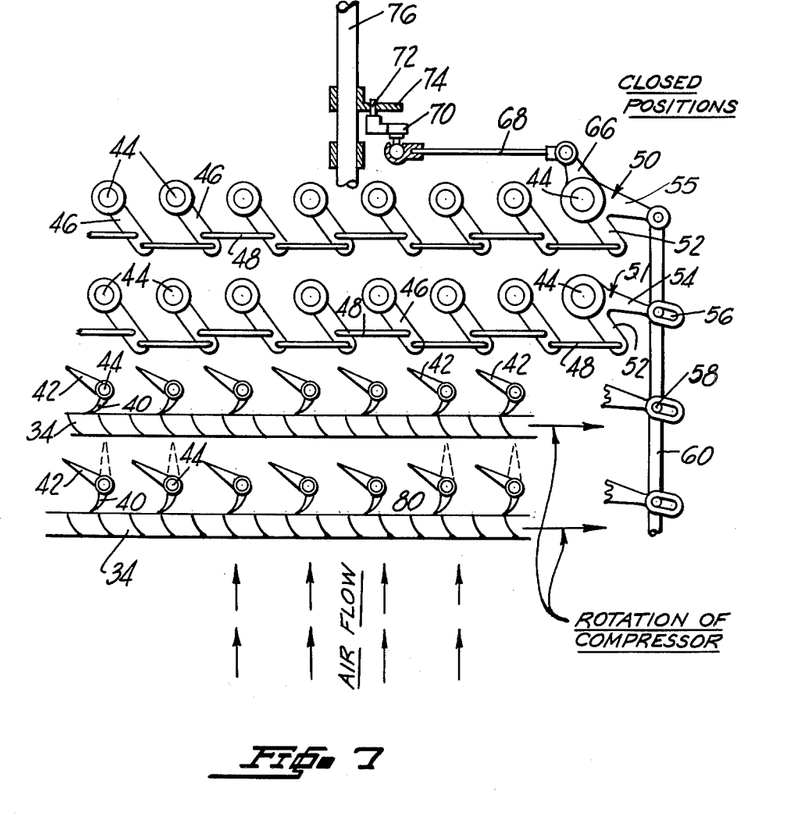
FIGURE 7 is a fragmentary developed view partially in section showing the actuating mechanism for stator throttle vanes shown in FIGURE 4.
Figure 8:
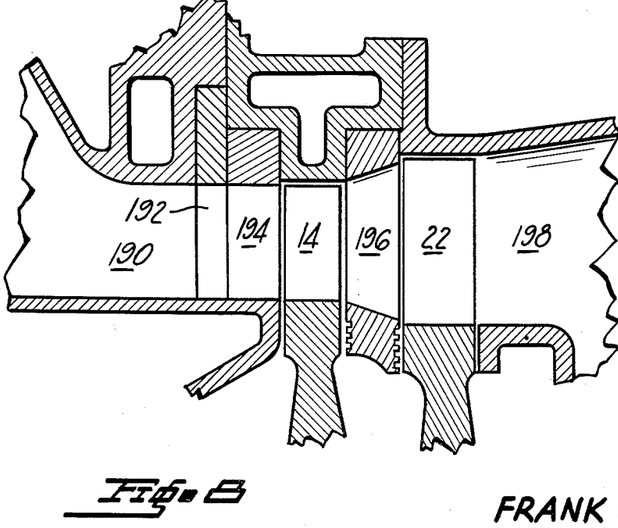
FIGURE 8 is an enlarged fragmentary view of the turbine and gate shown in FIGURE 4.
Figures 9, 10, 11:
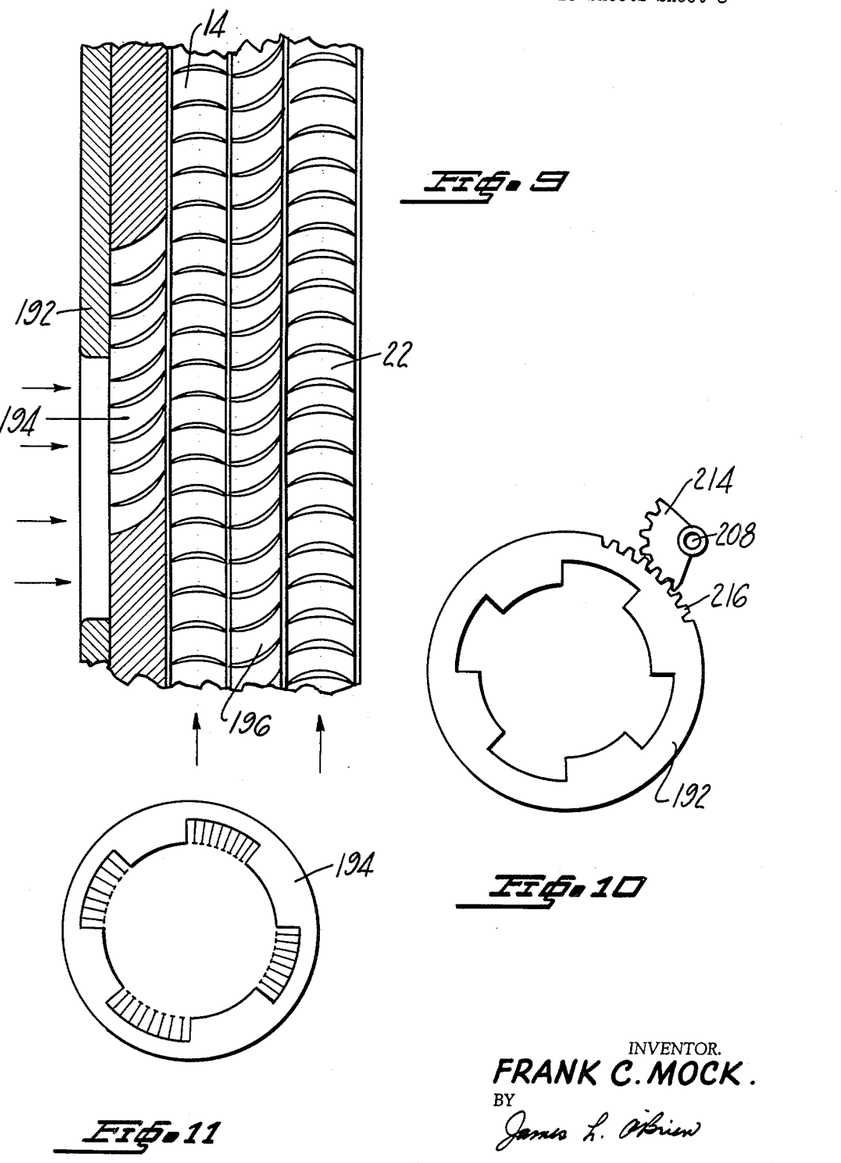
FIGURE 9 is a developed section of the periphery of the turbine and gate shown in FIGURE 8.
FIGURE 10 is a view taken along line 10—10 of FIGURE 4.
FIGURE 11 is a view taken along line 11—11 of FIGURE 4.
Figures 13, 14:
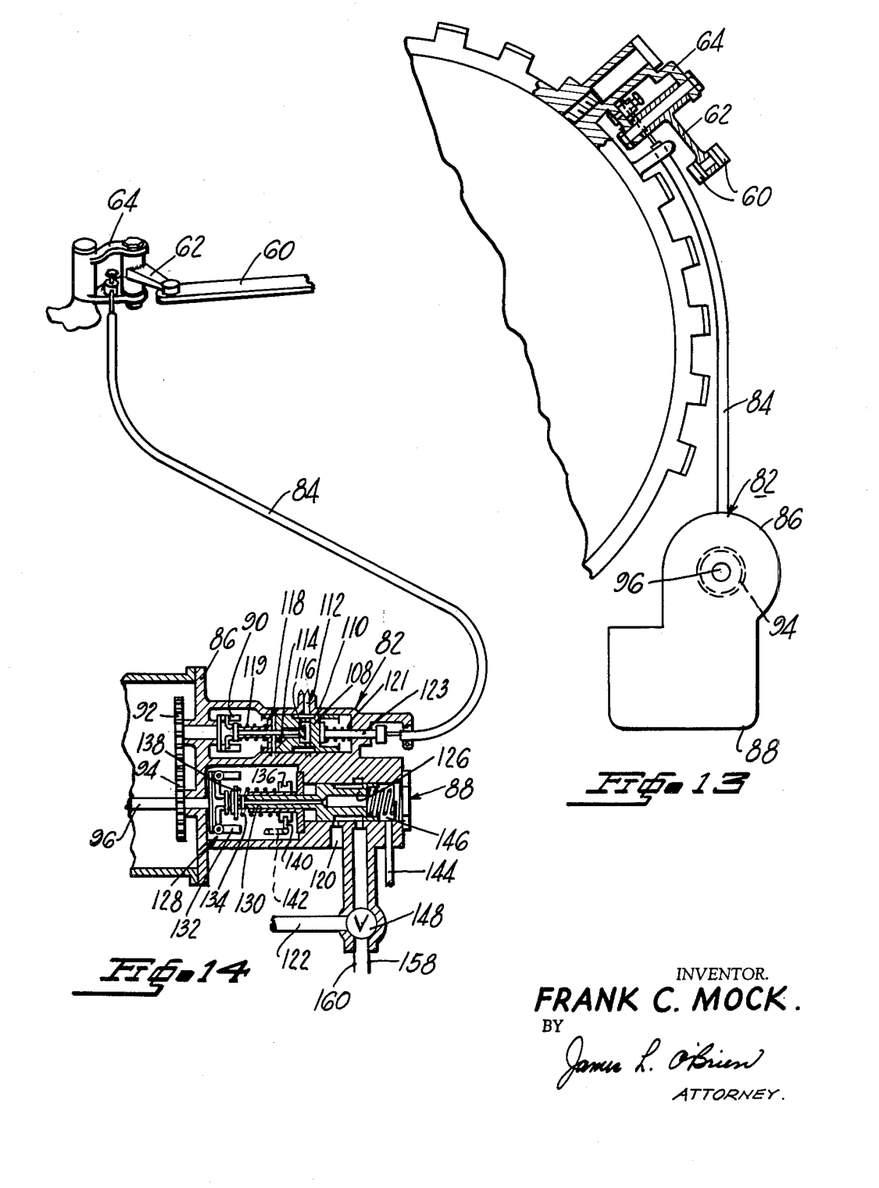
FIGURE 13 is a view taken in direction of arrows 13—13 of FIGURE 12.
FIGURE 14 is a sectional view taken along line 14—14 of FIGURE 16.
Figure 14A:
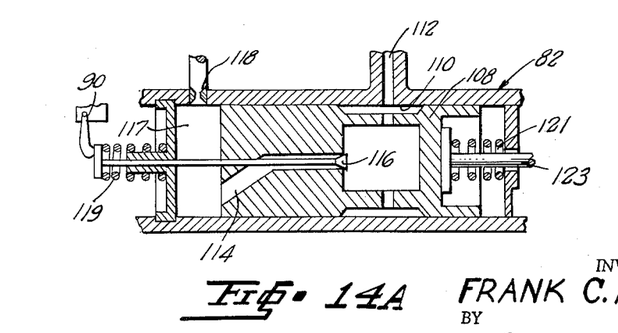
FIGURE 14a is an enlarged view of a portion of FIGURE 14 illustrating in greater detail the construction of a servomotor shown therein.

Compressor or air pump 12 includes a rotor or drum 32 which in the embodiment shown carries six rows of fixed blades 34. Compressor 12 is also provided with seven stator annuli 36 which carry a plurality of circumferentially spaced vanes 38 each of which is provided with a leading guide vane portion 40 and a trailing rotatable throttle portion 42, as best seen in FIGURE 5. The throttles 42 are secured to radially extending shafts 44. The shafts 44 of each stator annuli 36 are connected together by links 46 and 48, as best seen in FIGURE 7, so that all of the throttles 42 in a given stator annuli 36 are rotated simultaneously and equiangularly. Bell crank 50 is connected to one shaft 44 in the last stage annuli and bell cranks 51 are connected to one shaft 44 in each of the remaining stator annuli 36. One arm 52 of each of the bell cranks 50 and 51 is connected to a link 48. Each of the bell cranks 51 are provided with an arm 54 having a slot 56 which engage respective projections 58 formed on a master connecting rod 60. Connecting rod 60 is pivotally secured to an arm 55 formed on bell crank 50 in the last stage annuli 36. The other end of connecting rod 60, see FIGURE 16, is pivotally connected to a link 62 which in turn is pivotally connected to a link 64 which is rotatably mounted on the engine. As best seen in FIGURES 6 and 7, the bell crank 50 for the last stage is provided with an additional arm 66 which is connected by means of rod 68 to a lever 70 which carries a pin 72 mounted in a cam 74 which is secured to shaft 76. For convenience in illustration the manual control 78 is superimposed on FIGURE 6 and labeled to show the operating positions illustrated in FIGURE 1.

With the manual control 78 in position O, throttles 42 are rotated to their minimum flow position and the parts assume the position shown in full lines in FIGURE 7. Cam 74 is contoured so that movement of the manual control 78 from position O to position A does not affect rotation of the bell crank 50 in the last stage annuli and therefore has no affect on changing the position of the throttles 42. Movement of the manual control 78 from position A to position X causes bell crank 50 in the last stage annuli to rotate the master connecting rod 60 and the remaining bell cranks 51 to position the throttles 42 in their full open position, as shown in FIGURE 12. Movement of manual controls 78 in the reverse direction, that is from station X to station A, rotates the throttles 42 from their maximum flow position in a direction opposite to compressor rotor rotation to the minimum flow position.

As best seen in FIGURE 5, the stationary guide vane portion 40 of the stator vane 38 is curved from its leading edge to present the proper angle of attack to the air leaving the rotor blades 34. In practice the stator vanes 38 may be of similar construction for all of the stator annuli 36. In some installations, however, the guide vane 38 in the first stage annuli 36 may have a straight stationary guide vane portion 40 rather than a curved surface as shown in FIGURE 5. Also in the oulet of the last stage the throttle portion 42 of the stator vane 38 may be dispensed with and only the stationary guide vane portion 40 used to remove the swirl from the compressor discharge. The stationary guide vanes 40 are designed to change the direction of the airflow without appreciably changing its velocity or thermodynamic state and with the minimum resistance to flow. The throttles 42 are tapered in the direction of flow so as to have a decreasing transverse cross section in the direction of airflow and thus providing an increasing area between adjacent throttles 42 in the direction of airflow. Throttles 42 are constructed and arranged to act as a combination throttle, guide vane, and diffuser i.e. rotation of the throttles 42 changes the flow area and also the direction of flow and further acts as a diffuser to receive gas at high velocity and low static pressure to deliver it at a lower velocity and a higher pressure to the next stage with a minimum temperature rise.

For a given rotational speed of rotor 32 and a given mass flow, it is convenient and customary to consider the velocity through successive stages of the compressor 12 as constant. Since the mass flow must be the same at all stages, the velocity times area times density must be constant and therefore as the density increases with increasing compression at each stage the area of the compressor flow channel 80 decreases in the direction of flow. It is important that as the throttles 42 are rotated the angle of air delivery remains within certain limits of the rotor blade angle. In actual practice, neither the velocity nor direction of the flow leaving the vanes can be accurately computed or predicted. However, an average air angle vector as shown in FIGURE 5 may be utilized with sufficient accuracy. As shown at A in FIGURE 5, a rotor blade 34 having a rotational vector N and an air entrance vector $M_1$ will require an entrance angle $\alpha$. As shown at B in FIGURE 5, a discharge velocity $M_2$ off the blade at an angle $\beta$ will give a discharge, relative to the stationary guide vane, approximating the vector Q. With the throttles 42 in their maximum flow position, such as is shown by the solid lines, the airflow leaving the stator annuli is represented at C by the vector $M_3$ and makes an angle relative to the blade substantially equal to the original angle $\alpha$. With the throttles 42 in their minimum flow position, such as is shown by the dotted lines in FIGURE 5, the airflow leaving the stator annuli at a velocity $M_3$ is represented at D by the vector R relative to the rotor blade, with an air angle ω greater than the blade angle α but still within acceptable incidence limits for efficient operation of the compression.

As shown in FIGURE 5, the stationary vane portions 40 are faired into the cylindrical hub of throttles 42 so as to provide a smooth contour in all positions of the throttles.

As the speed of the engine is reduced from A to O, FIGURE 1, the compression ratio is also reduced, as is shown in FIGURE 1; and with a reduction in compression ratio the change in density per stage is also reduced. This necessitates a progressive change of flow channel area through the compressor in the direction of decreasing the upstream passage area with respect to the downstream passage area. To effect a progressive change of flow channel area 80 as a function of engine speed there is provided a servo piston unit 82 which is positioned as a function of engine speed as will be explained subsequently, and which is connected through a Bowden wire 84 to link 64, as best seen in FIGURES 12, 13, 14 and 14a. The servo piston unit 82 is provided with a casing or housing 86 which is secured to an end of the fuel control casing 88 and is provided with flyweights 90 which are driven as a function of engine speed through gears 92, 94, shaft 96, and as shown in FIGURE 16, gears 98, 100, drive shaft 102 and bevel gears 104 and 106 which are driven by the engine shaft 16. A piston 108 is slidably mounted in casing 86 and is formed with a chamber 110 which is connected to a source of high pressure fluid (not shown) through conduit 112. A conduit 114 controlled by valve 116 connects chamber 110 with a low pressure vent 118. The flyweights 90 act in opposition to spring 119 to urge valve 116 toward open position at a predetermined engine speed. When valve 116 is opened high pressure fluid acting on the left side of piston 108 in chamber 117 urges the piston to the right in opposition to spring 121 whereupon plunger 123 is also moved to the right causing Bowden wire 84 to move lever 64 counterclockwise thereby actuating rod 60 to progressively rotate the throttles 42 in successive stator annuli in a flow channel area increasing direction with increasing engine speed and conversely with decreasing engine speed.

Since to avoid compressor stall inefficient or unstable operation of the compressor at speeds lower than its designed high speed operation requires that the stator annuli throttles 42 be progressively varied in successive annuli, as the engine speed decreases, the servo piston unit 82 moves lever 64 clockwise which in turn rotates the master connecting rod 60 counterclockwise about its pivot on the last stage bell crank 50. The geometrical change is such as to rotate the throttles 42 counterclockwise progressively in successive annuli, the motion being the greatest in the first stage annuli and none at all at the last stage annuli, thus giving the desired graduation of areas through the successive stages of compressor for low speed operation.

Fuel is supplied to the engine from a source not shown via conduit 120 (FIGURES 4 and 14) to fuel control 88 and from thence via conduit 122 to nozzles 124 disposed in combustion chambers 20. Fuel control 88 includes a spool valve 126 which is operatively connected to an adjustable governor 128 by means of rod 130. Governor 128 includes a pair of flyweights 132 which are rotated as a function of engine speed through shaft 96, gears 98, 100, drive shaft 102 and gears 104 and 106. Valve 126 is urged toward open position by a spring 134 which reacts between an adjustable collar 136 and a bearing member 138, the latter being secured to the end of rod 130. The flyweights 132 exert a force as a function of engine speed to oppose the force of spring 134 and urge valve 126 toward closed position. The governor is adjusted by adjusting collar 136 by means of forked lever 140 and crank 142. A drain passage 144 is provided to remove leakage fluid from chamber 146 in which valve 126 reciprocates. Fuel control 88 is provided with a valve 148 which is regulated in response to turbine inlet temperature by means of a temperature probe or thermocouple 150, conductors 152 and 154, amplifier 156 and conductors 158 and 160.

Figure 17:
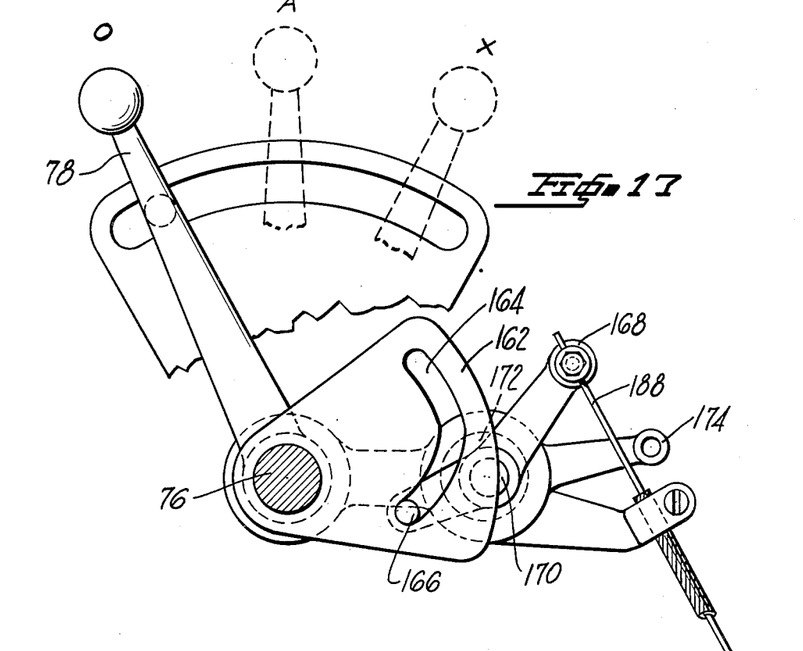
FIGURE 17 is an enlarged view of the governor control in FIGURE 4.
Figure 18:
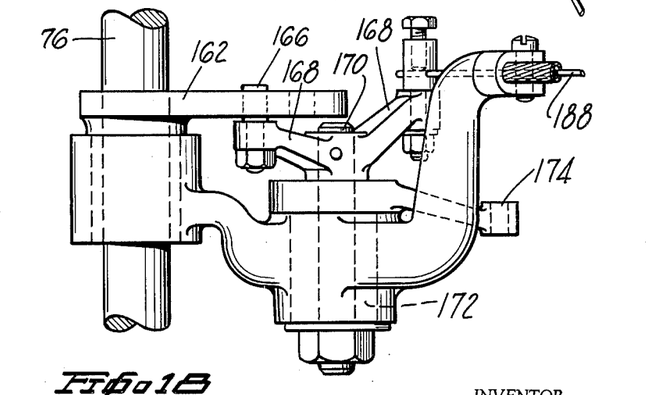
FIGURE 18 is another view of the governor control shown in FIGURE 17.

As best seen in FIGURES 16, 17 and 18 a governor cam 162 is secured to shaft 76 and is provided with a slot 164 which carries a pin 166 secured to one end of a crank 168 which is rotatably mounted on a shaft 170. As best seen in FIGURE 17 shaft 170 is mounted in an eccentric bushing 172 having a trim lever 174 formed integrally therewith. Trim lever 174 may be operated manually or by other suitable means such as the motor 176 (FIGURE 4) to adjust governor 128 independently of the control lever 78. Thermocouple 150 is operatively connected to motor 176 through conductors 152 and 154, amplifier 156, conductors 178 and 180, amplifier 182 and conductors 184 and 186. Bowden wire 188 connects crank 168 to crank 142 for adjusting governor 88.

Figure 15:
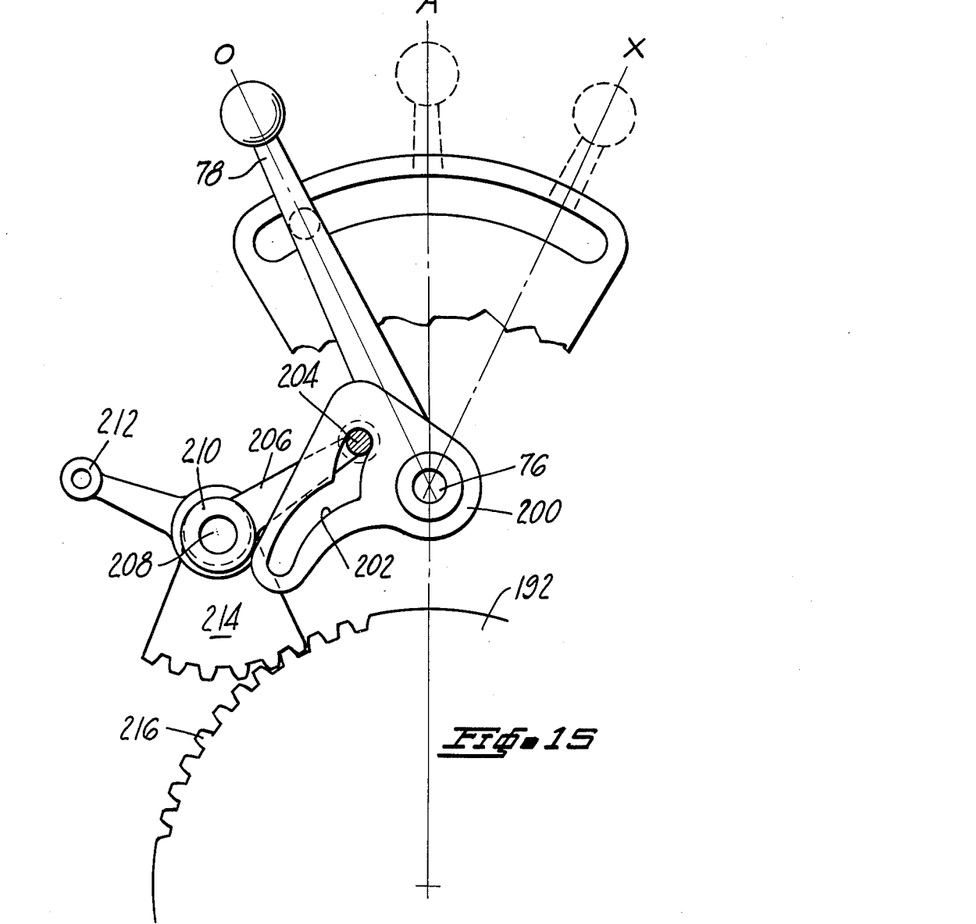
FIGURE 15 is an enlarged diagrammatic view of the turbine gate shown in FIGURE 10 together with its control cam.
Figure 19:
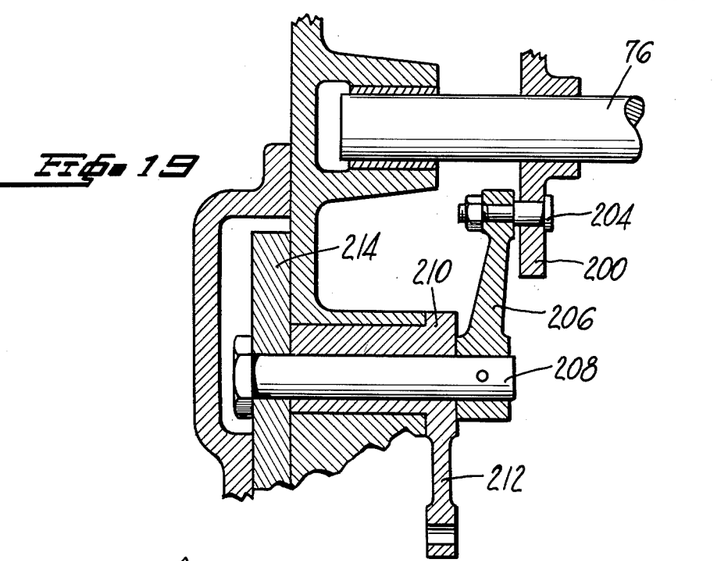
FIGURE 19 is a sectional view of the turbine gate control shown in FIGURE 15.

Referring now to FIGURES 4, 8, 9, 10 and 11 the products of combustion are discharged from the combustion chambers 20 through passages 190, movable shield or valve 192, diaphragm guide vane member 194, turbine 14, stator 196, second turbine 22 and finally through the exhaust pipe 198. Turbine shield 192 is rotated to vary the inlet flow area to the turbines by means of a turbine shield cam 200 (FIGURES 4, 15 and 19) which is provided with a slot 202 which in turn carries a pin 204 secured to lever 206 which is rotatably mounted on a shaft 208. Shaft 208 is rotatably disposed within an eccentric bushing 210 which has a trim lever 212 formed integrally therewith. A gear segment 214 is secured to shaft 208 and is in meshing engagement with a gear segment 216 formed on the periphery of shield 192. Trim lever 212 may be actuated manually or by suitable means in response to an engine operating condition. As shown, in FIGURE 4, trim lever 212 is regulated as a function of turbine inlet temperature by means of an electric motor 218 which is operatively connected to thermocouple 150 by means of conductors 154 and 156, amplifier 176, conductors 178 and 180, amplifier 182 and conductors 220 and 222.

In the operation of the device described thus far, the control lever 78 rotates shaft 76 and coordinately controls the effective capacities of the compressor 12 and the turbine 14 and adjust the governor 88 in accordance with a predetermined schedule as determined by the cams 74, 200 and 162. The schedule may be set for optimum thermal efficiency and/or acceleration response such as represented by the curve OAX of FIGURE 1 and exemplified by the cam contours shown in the various figures of the drawings, or the schedule may be set to provide any desired operating characteristic below curve OAX. As illustrated, the cam slots are contoured whereby upon opening movement of the control lever 78 the governor 88 is adjusted to bring the engine up to a predetermined speed while cams 74 and 200 hold the stator annuli throttles and turbine shield in their minimum flow positions. Upon further opening movement of the control lever 78, the governor maintains the engine speed substantially constant at a predetermined value while the throttles and turbine shield are moved toward their maximum flow position. The trim lever 174 and 212 provide adjustment to meet exact coordination of the control elements to compensate for individual engine operating characteristics or changes in operating characteristics due to engine deterioration. The trim levers also permit the engine operator to make a limited departure from the scheduled control if he so desires.

Trim levers have been provided for both the shield or gate control and the governor control and as shown have been made responsive to turbine inlet temperature. Generally, one such trim lever will suffice. If the turbine inlet temperature is too high, actuating trim lever 174 to reduce the governor setting will reduce the temperature. Similarly, actuating trim lever 212 to open the throttle shield 192 would put a greater pressure differential through the turbine 14 producing more power thereby speeding up the compressor, after which the governor would reduce the fuel and the turbine inlet gas temperature.

Since the collective effect of these elements of (a) compressor speed; (b) combustion temperature; (c) compressor flow channel area; and (d) exhaust gate temperature; upon the thermal efficiency is rather complex, these relations may be restated as follows:

(1) If the turbine flow area is too great for the compressor flow there will not be enough power, at the desired turbine inlet temperature, to operate the compressor. Conversely, if the turbine flow area is too small the compressor may encounter a stall or unstable operating condition;

(2) For any given combination of turbine and compressor flow areas, the engine speed will increase as the gas temperature at the turbine is increased, providing the compressor does not stall or operate unstably;

(3) The fuel feed may be considered as proportional to the air mass flow times the temperature rise during combustion;

(4) The efficiency of this cycle will vary with the temperature rise of combustion, which thus calls for the minimum weight of air for a given power, compatible with safe turbine temperatures;

(5) The efficiency of the cycle will depend greatly upon the expansion ratio through the turbine, which ratio increases with the compressor speed, and decreases if the exhaust gate is opened too wide;

(6) In determining the proper air mass flow for a given power point, if the exhaust gate of area is too small in proportion to the compressor flow channel area, the compressor will encounter the well known "stall" condition; but if the exhaust gate area is too large, the combustion chamber pressure for a given fuel feed will drop as mentioned in (5) above.

Within practical limits, it is not necessary to hold exact ratios of compressor flow channel area and exhaust gate area to the compressor speed and fuel flow. One simply expressed expedient is, through as wide a part of the operating range as possible, to hold the combustion chamber temperature to a fixed safe maximum by automatic thermal limitation of the fuel feed and to simultaneously hold the compressor speed to a safe maximum by a speed governor working on the fuel feed and then to obtain the desired power selection by proper mutual variation of the compressor flow channel area and turbine gate area.

In general the coordination of the three controls, viz. stator annuli throttles, turbine shield and governor, is non-linear in the ratio of movement of the control lever to the effect obtained thereby thus requiring control by non-linear or cam elements. Furthermore, coordination of these controls to obtain optimum performance from individual engines having different operating characteristics make it desirable to provide adjustment of at least one element with respect to the other two.

Figure 20:
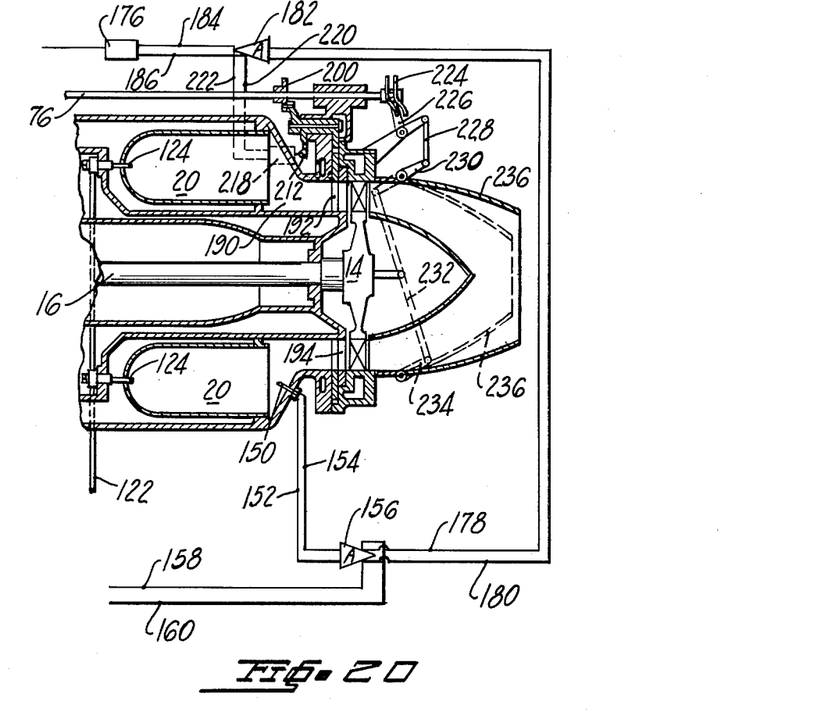
FIGURE 20 is a fragmentary view showing a modification of the engine shown in FIGURE 4.

Referring now to the embodiment shown in FIGURE 20, the present invention is shown incorporated in the turbojet engine and illustrates the additional control of the tailgate or exhaust pipe flow area. As shown in FIGURE 20 shaft 76 actuates a barrel cam 224 which through levers 226, 228, 230, 232 and 234 actuate the tailgate lobes 236. In the power range from A to X shown in FIGURE 1, the governor 88 is held at a constant setting while compressor flow channel 80 and the turbine shield 192 and the tailgate lobes 236 are varied from their minimum area position at minimum power up to their maximum area position at maximum power all at constant engine speed. For reduction of power from A to O, the compressor flow channel area, turbine flow channel area, and tailgate area, are held substantially in their minimum flow area position while the engine speed governor 88 is adjusted to reduce engine speed. The turbojet engine shown in FIGURE 20 will provide substantially better fuel economy at part load than in a standard turbojet engine where part load operation is obtained by reducing engine speed. Also, the turbojet engine of the present invention will provide substantially instantaneous increase of thrust when the throttle is opened which cannot be obtained from a standard turbojet engine wherein an increase in thrust requires an increase in engine speed.

While I have herein illustrated preferred embodiments of my invention it readily will be understood that numerous changes, modifications and substitutions may be made therein without departing from the spirit and scope of my invention.

I claim:

1. In a gas turbine engine having a multi-stage axial flow compressor, a plurality of stator annuli for each stage of said compressor, each of said annuli having a progressively decreasing transverse area in the direction of flow, a plurality of circumferentially spaced stator vanes in each of said annuli, said vanes having a stationary leading portion and a rotatable trailing portion, said vane trailing portion being rotatable to vary the transverse area between adjacent vanes, link means for coordinately rotating the trailing portions of said vanes equiangularly within a given annulus to control the transverse area per annulus, means responsive to engine speed for actuating said link means to impart progressively decreasing angular rotation to said trailing portions in successive annuli in the direction of flow, and manual means for actuating said link means to angularly rotate said trailing portion while maintaining the transverse area ratio between separate stator annuli substantially constant.

2. In a gas turbine engine having a multi-stage compressor, throttle means for controlling the transverse area of the interstage flow channels, manual means for coordinately actuating said throttle means to vary the transverse area per stage while maintaining the interstage ratio of transverse areas substantially constant, and means responsive to engine speed for actuating said throttle means independently of said manual means to progressively decrease the transverse area of the flow channels in successive stages from the last stage to the first stage with decreasing engine speed.

3. In a gas turbine engine having a multi-stage axial flow compressor with interstage stator annuli, a plurality of circumferentially speed stationary guide vanes in each of said annuli, radially extending shafts mounted in said annuli immediately downstream of each of said guide vanes, a throttle-guide vane secured to each of said shafts, link means interconnecting the shafts in each of said annuli, a bell crank connected to one of the shafts in the last stage annulus, crank means connected to one shaft in each annuli except the last stage annulus, a slot formed in each of said crank means, a connecting rod pivotally secured at one end to said bell crank, projections formed on said connecting rod for respective engagement in said slots, lever means pivotally secured to said engine and to the other end of said connecting rod, means for rotating said bell crank to actuate said connecting rod whereby said throttle-guide vanes are coordinately rotated to vary the flow area per stage while maintaining the flow area ratio between stages substantially constant, and means responsive to engine speed for actuating said lever means to thereby rotate said connecting rod about its bell crank pivot whereby progressively more rotation is imparted to the throttle guide vanes in successive annuli from the last stage to the first stage.

4. A gas turbine engine comprising a multi-stage compressor, a turbine driving said compressor, a flow path connecting the outlet of said compressor to the inlet of said turbine, a combustion chamber in said flow path, means for proportionally varying the flow channel area through said compressor to maintain the transverse area ratio between compressor stages substantially constant, means responsive to engine speed for modifying said first mentioned means to progressively decrease the compressor flow channel area in a counter flow direction with decreasing engine speed and vice versa, means for varying the fuel supply to said combustion chamber and means for varying the flow through said turbine.

5. In a muti-stage compressor, the combination of a first compressor stage and a last compressor stage each having a plurality of annularly arranged non-rotative blades and a plurality of annularly arranged rotative blades, said non-rotative blades operative to define the cross-sectional area per stage between adjacent blade members and thus define stage capacity, said last stage of non-rotative blades defining less crosssectional area than said first stage to provide a predetermined area ratio between said first and last stage, and means for angularly adjusting said non-rotative blades to vary the cross sectional area per stage while maintaining the area ratio between first and last stage substantially constant.

6. In a multi-stage compressor having at least two stages, the combination of a first upstream stage and a second downstream stage each having a plurality of annularly arranged non-rotative blades and a plurality of annularly arranged rotative blades, said non-rotative blades operative to define the cross sectional area per stage between adjacent blade members and thus define stage capacity, said second stage of non-rotative blades defining less cross-sectional area than said first stage to provide a predetermined area ratio between said first and second stage, and means for adjusting said non-rotative blades to vary the cross-sectional area per stage while maintaining the area ratio between first and second stages substantially constant.

References Cited in the file of this patent

UNITED STATES PATENTS

| | | |
|---|---|---|
| 2,371,706 | Planiol | Mar. 20, 1945 |
| 2,500,070 | Hagen | Mar. 7, 1950 |
| 2,672,726 | Wolf et al. | Mar. 23, 1954 |
| 2,688,844 | McLeod et al. | Sept. 14, 1954 |
| 2,778,564 | Halford et al. | Jan. 22, 1957 |
| 2,914,241 | Novak | Nov. 24, 1959 |
| 2,931,168 | Alexander et al. | Apr. 5, 1960 |
| 2,936,108 | Balcom | May 10, 1960 |

FOREIGN PATENTS

| | | |
|---|---|---|
| 951,944 | France | Apr. 25, 1949 |
| 704,856 | Great Britain | Mar. 3, 1954 |